United States Patent
Tsay et al.

(10) Patent No.: US 11,230,189 B2
(45) Date of Patent: Jan. 25, 2022

(54) SYSTEM AND METHOD FOR APPLICATION INTERACTION ON AN ELONGATED DISPLAY SCREEN

(71) Applicant: Honda Motor Co., Ltd., Tokyo (JP)

(72) Inventors: Michael Tsay, Irvine, CA (US);
Richard Magness, Los Angeles, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 403 days.

(21) Appl. No.: 16/370,398

(22) Filed: Mar. 29, 2019

(65) Prior Publication Data
US 2020/0307377 A1    Oct. 1, 2020

(51) Int. Cl.
*B60K 35/00*    (2006.01)

(52) U.S. Cl.
CPC ........ *B60K 35/00* (2013.01); *B60K 2370/115* (2019.05); *B60K 2370/164* (2019.05); *B60K 2370/166* (2019.05); *B60K 2370/186* (2019.05); *B60K 2370/195* (2019.05)

(58) Field of Classification Search
CPC ...... B60K 2370/115; B60K 2370/1442; B60K 2370/1523; B60K 2370/164; B60K 2370/166; B60K 2370/184; B60K 2370/186; B60K 2370/195; B60K 2370/197; B60K 370/55; B60K 35/00; B60K 37/06
See application file for complete search history.

(56) References Cited

U.S. PATENT DOCUMENTS

| | | | |
|---|---|---|---|
| 9,274,525 B1 | 3/2016 | Ferguson et al. | |
| 9,550,500 B2 | 1/2017 | Hackenberg et al. | |
| 2009/0228820 A1* | 9/2009 | Kim | G06F 3/04886 715/769 |
| 2013/0215332 A1* | 8/2013 | Matsumoto | H04N 21/8106 348/738 |

(Continued)

FOREIGN PATENT DOCUMENTS

DE   102009057082 A1   6/2011
EP        2927791 A1  10/2015

(Continued)

OTHER PUBLICATIONS

"In Control Infotainment" https://www.jaguar.com/incontrol-global/incontrol/infotainment.html (Accessed Jun. 11, 2018).

(Continued)

*Primary Examiner* — Tyler J Lee
(74) *Attorney, Agent, or Firm* — Armstrong Teasdale LLP

(57) ABSTRACT

A vehicle infotainment system is provided. The vehicle infotainment system includes a display screen for displaying a plurality of applications and a controller communicatively coupled to the display screen. The controller is configured to display the plurality of applications in an inactive state. The controller is also configured to receive a user input to activate a first application of the plurality of applications. The controller is further configured to transition the first application into an active state. In addition, the controller is configured to display the active first application to the left of the plurality of inactive applications on the display screen.

20 Claims, 5 Drawing Sheets

(56) References Cited

U.S. PATENT DOCUMENTS

| | | | | |
|---|---|---|---|---|
| 2014/0184471 A1* | 7/2014 | Martynov | ............. | G06F 3/0481 345/1.2 |
| 2014/0354559 A1* | 12/2014 | Terunuma | .......... | G06K 9/00402 345/173 |
| 2014/0365126 A1* | 12/2014 | Vulcano | ............... | G01C 21/362 701/533 |
| 2015/0227298 A1* | 8/2015 | Kim | ...................... | G06F 1/1694 715/799 |
| 2016/0080542 A1* | 3/2016 | Park | ................. | H04M 1/72403 455/566 |
| 2016/0139798 A1* | 5/2016 | Takikawa | .............. | G06F 3/0482 345/173 |
| 2016/0153799 A1* | 6/2016 | Kodama | ................ | G01C 21/36 701/538 |
| 2016/0188197 A1* | 6/2016 | Ryu | ........................ | G06F 3/002 345/156 |
| 2016/0003208 A1 | 11/2016 | Wild et al. | | |
| 2017/0000832 A1 | 3/2017 | Wild et al. | | |
| 2018/0001369 A1 | 5/2018 | Feit et al. | | |
| 2018/0335921 A1* | 11/2018 | Karunamuni | ....... | G06F 3/04817 |
| 2018/0335939 A1* | 11/2018 | Karunamuni | ............. | G06F 8/38 |
| 2018/0356950 A1* | 12/2018 | Bian | .................... | G06F 3/04842 |
| 2020/0026417 A1* | 1/2020 | Corbett | .................. | H04M 1/18 |
| 2021/0006671 A1* | 1/2021 | Karaki | .............. | H04N 1/00474 |

FOREIGN PATENT DOCUMENTS

| | | |
|---|---|---|
| EP | 2930050 A1 | 10/2015 |
| EP | 2960099 A2 | 6/2016 |

OTHER PUBLICATIONS

"BMW Self Driving Car Demonstration BMW i8 Roadster 2018 BMW Autonomous Connected Car CARJAM TV HD" https://www.youtube.com/watch?v=0qCqt8jLPaE (Jul. 6, 2017).

"Byton Concept EV First Ride" https://www.theverge.com/transportation/2018/1/9/16867332/byton-electric-ev-car-ride-first-look-test-touchscreen-ces-2018 (Jan. 9, 2016).

* cited by examiner

SYSTEM AND METHOD FOR APPLICATION INTERACTION ON AN ELONGATED DISPLAY SCREEN

BACKGROUND

The field of the disclosure relates generally to the interaction with applications on a user interface and, more particularly, to systems for use in controlling application on a user interface with multiple applications.

Generally, known vehicle infotainment systems provide information and entertainment options to occupants of a vehicle. Known infotainment systems may accept user input to control various aspects of the occupant's comfort, such as the vehicle interior climate and/or entertainment. Many of these controls are provided while the vehicle is in motion. However, while a vehicle's driver is accessing these controls, the user's attention is diverted from the road while actively driving. As such, a need exists to provide infotainment controls in a user-accessible manner that enables a user to quickly access desired controls while driving. Moving the controls to a more user-friendly location would facilitate reducing an amount of time that the user's attention is deviated from actively driving.

BRIEF DESCRIPTION

In one aspect, a vehicle infotainment system is provided. The vehicle infotainment system includes a display screen for displaying a plurality of applications and a controller communicatively coupled to the display screen. The controller is configured to display the plurality of applications in an inactive state. The controller is also configured to receive a user input to activate a first application of the plurality of applications. The controller is further configured to transition the first application into an active state. In addition, the controller is configured to display the active first application to the left of the plurality of inactive applications on the display screen.

In another embodiment, a method of operating a user interface is provided. The method is implemented by at least one processor in communication with at least one memory device, and a display screen. The method includes displaying the plurality of applications in an inactive state. The method also includes receiving a user input to activate a first application of the plurality of applications. The method further includes transitioning the first application into an active state. In addition, the method includes displaying the active first application to the left of the plurality of inactive applications on the display screen.

BRIEF DESCRIPTION OF THE DRAWINGS

FIG. 4 illustrates a screenshot of an exemplary user interface of the vehicle control system shown in FIGS. 1 and 2.

DETAILED DESCRIPTION

Figure 1:
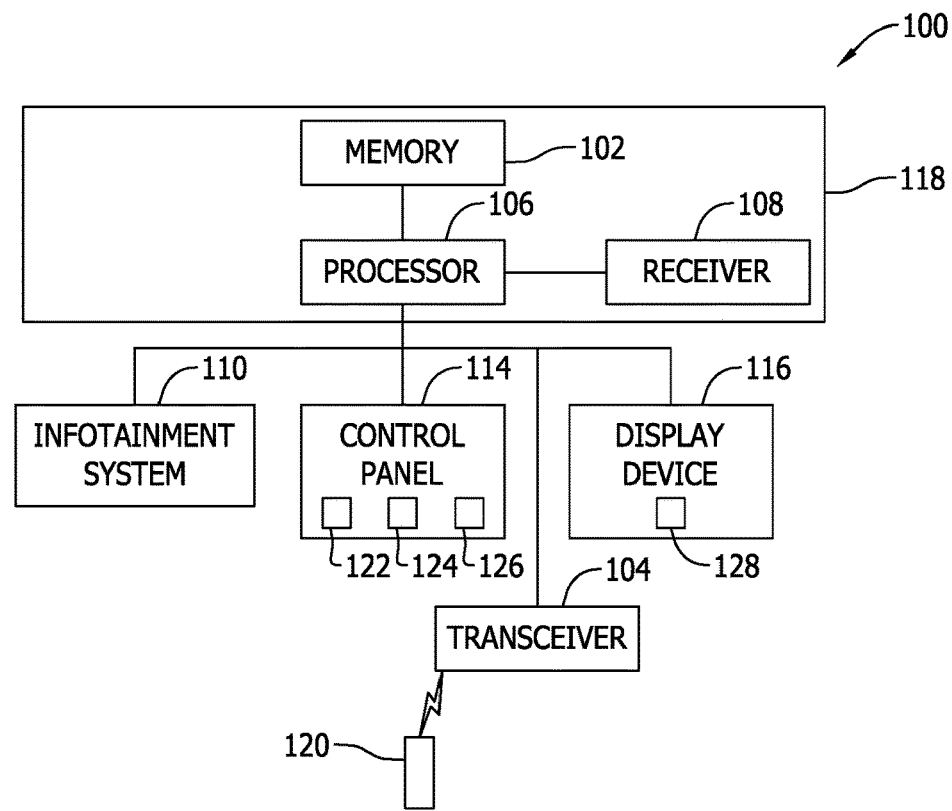
FIG. 1 is a block diagram of an exemplary vehicle control system.

Various embodiments will be better understood when read in conjunction with the appended drawings. To the extent that the figures illustrate the functional blocks of various embodiments, the functional blocks are not necessarily indicative of a division between hardware circuitry. Thus, for example, one or more of the functional blocks (e.g., systems, devices, processors, controllers, and/or memories) may be implemented in a single piece of hardware (e.g., a general purpose signal processor or random access memory, hard disk, or the like) or in multiple pieces of hardware. Similarly, any program may be a stand-alone program, may be incorporated as subroutines in an operating system, may be a function(s) in an installed software package, and/or the like. It should be understood that the various embodiments are not limited to the arrangements and instrumentality shown in the drawings.

Various embodiments of methods and systems for controlling functions of an exemplary vehicle control system, including a vehicle infotainment system, are provided. It should be noted that although the various embodiments are described in connection with the automotive industry, such as for use with an automobile, one or more embodiments may be implemented in different industries and for different applications. Additionally, communication of information used in accordance with one or more embodiments may be performed with different types of communication protocols, as well as using different types of communication lines and communication buses.

FIG. 1 is a block diagram of an exemplary vehicle control system 100. In the exemplary embodiment, the vehicle control system 100 includes a memory 102, a transceiver 104, a processor 106, a receiver 108, a vehicle infotainment system 110, a control panel 114, and a display device 116. In some embodiments, the memory 102, the transceiver 104, the processor 106, and/or the receiver 108 may be included in a computing device, such as a controller 118 for the system 100, which may control or otherwise be communicatively coupled to any other component within the system 100 (e.g., the vehicle infotainment system 110, the control panel 114, and/or the display device 116).

The processor 106 may include one or more conventional electronic processors that interpret and execute instructions. The memory 102 may include a random access memory (RAM), a read-only memory (ROM), and/or another type of dynamic or static storage device that stores information and instructions for execution by the processor 106. The RAM, or another type of dynamic storage device, may store instructions as well as temporary variables or other intermediate information used during execution of instructions by the processor 106. The ROM, or another type of static storage device, may store static information and instructions for the processor 106.

The transceiver 104 may communicate with the processor 106 via a communication line, and may communicate wirelessly or via a wired connection with a portable device 120. The portable device 120 may include a mobile phone or other communication device. In some embodiments, the transceiver 104 may communicate wirelessly with the portable device 120 via a Bluetooth® protocol (Bluetooth is a registered trademark of Bluetooth Sig., Inc. of Bellevue, Wash.). In other embodiments, another wireless protocol may be used. In some embodiments, the transceiver 104 may be included as part of the controller 118.

In the exemplary embodiment, vehicular infotainment system 110 may be used to enable the user to access entertainment options and climate controls for the vehicle (not shown). The vehicle infotainment system 110 may include one or more speakers for playing audio content, as well as one or more controls for controlling audio output from one or more of the speakers. The vehicle infotainment system 110, in some embodiments, includes a rear entertainment system, such that passengers in a rear passenger location of a vehicle may be entertained. The rear entertainment system may include a display screen for displaying video or picture content in combination with audio content, and one or more speakers located at one or more rear passenger locations of the vehicle to play the audio content. In some such embodiments, audio content delivered using the rear entertainment system may be different than audio content delivered to a front portion of the vehicle.

The control panel 114 may communicate with the processor 106 via a communication line to transmit data to/from the control panel 114, such as for control of other modules or systems of the vehicle control system 100. In the exemplary embodiment, the control panel 114 includes, and/or is communicatively coupled to, a touchpad 122, one or more steering wheel keypads 124, and microphone system 126 for receiving an input from a user for control of the vehicle control system 100. Additionally or alternatively, the control panel 114 may include other input mechanisms, such as mechanical buttons or other controls (e.g., knobs, switches, etc.) associated with the touchpad 122 to receive inputs for controlling the vehicle control system 100. The control panel 114 may have a dedicated control module or unit configured to process the control inputs and/or to process the data to be displayed on the display device and/or the touchpad 122. Alternatively, such control functions may be processed by the processor 106 (e.g., as part of the controller 118). The steering wheel keypads 124 may include one or more buttons to allow the user to control the vehicle control system 100. The microphone system 126 may allow the user to control the vehicle control system 100 through audible commands.

In the exemplary embodiment, the touchpad 122 is configured to detect when a finger touches it. The touchpad senses the user's finger movement and downward pressure. In some embodiments, the control panel 114 interprets the user's movements and pressure to determine the user's inputs. In the exemplary embodiment, the touchpad 122 is remote from any display screen 128.

The display device 116 may communicate with the processor 106 via a communication line to transmit data to/from the display device 116, such as for display of various information to the user of the vehicle. In the exemplary embodiment, the display device 116 includes one or more display screens 128 for displaying information to the user. In one embodiment, the display device 116 is separate from the control panel 114, such as located at a different location in the vehicle. For example, the display screens 128 may be selectively positioned for convenient viewing by the user, and the touchpad 122 may be selectively positioned within a comfortable distance from a hand of the user. Each of the multiple display screens 128 may display different icons, graphics, and the like. In an alternative embodiment, the display device 116 is the same as, or is coupled to, the control panel 114. For example, the touchpad 122 is combined with the display screens 128, such as via a touchscreen that functions as both an output device and an input device.

Figure 2:
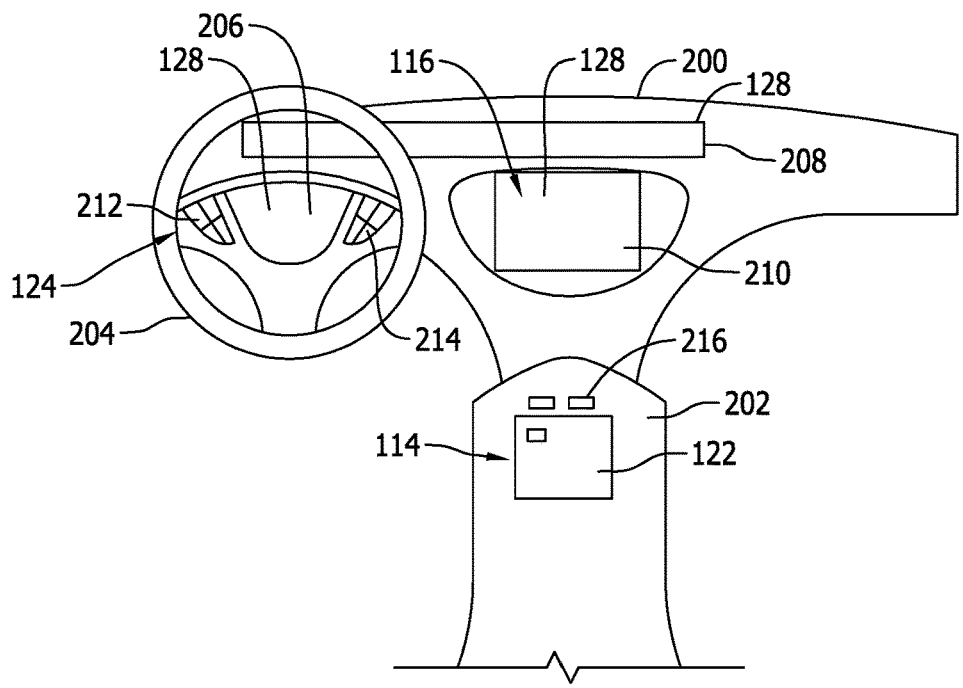
FIG. 2 is a partial schematic view of an exemplary vehicle including the vehicle control system shown in FIG. 1.

FIG. 2 is a partial schematic view of a vehicle including the vehicle control system 100. The vehicle includes a dashboard 200, a center console 202, and a steering wheel 204. In an exemplary embodiment, the display device 116 includes multiple display screens 128, such as, but not limited to, steering wheel display 206, elongated display screen 208, and additional display 210. A steering wheel display 206 is in the center of the steering wheel 204, such that the user may easily glance down at the information on the steering wheel display 206 without being distracted from operating the vehicle.

An elongated display screen 208 is at a central portion of the dashboard 200 such that a user, or an operator/driver, of a vehicle may easily view the display screen 128 without being distracted from operating the vehicle. The elongated display screen 208 may be located close to the user's eye level to enable the elongated display screen 208 to be viewed peripherally while the user views the roadway ahead. In other embodiments, the elongated display screen 208 extends along the dashboard 200 such that a portion of elongated display screen 208 is behind the steering wheel 204. In other embodiments, the elongated display screen 208 may be at other locations within the vehicle. In another embodiment, the elongated display screen 208 extends along the dashboard 200 from behind the steering wheel 204 to the right edge of the center console 202. In some of these embodiments, there is an additional display screen 210 in the center of the dashboard 200 below the elongated display screen 208. In some embodiments, the steering wheel display 206, elongated display screen 208, and additional display 210 are in communication with display device 116. The elongated display screen 208 is configured to be divided to provide multiple views and different types of information, such as, but not limited to, navigation, messaging, videos, audio and video communication, music, and others.

The touchpad 122 may be located next to the user of the vehicle. The touchpad 122 is positioned to be easily reachable by the user while operating the vehicle. In some embodiments, the touchpad 122 may be located in a center console area 202 next to the user. The touchpad 122 enables the user to select icons displayed on the display screen 128 and associated functions. In some embodiments, the steering wheel keypads 124 include a left keypad 212 and a right keypad 214, where each keypad 212 and 214 includes one or more buttons. In addition, touchpad 122 may include one or more physical buttons 216 or be positioned proximate to one or more physical buttons 216.

The control panel 114 may be communicatively coupled to the controller 118, which controls the display device 116, or may be communicatively coupled directly to the display device 116 for controlling the controller 118. Furthermore, the control panel 114 may be coupled to various sub-systems of the vehicle control system 100, such as the vehicle infotainment system 110, and the like. For example, the control panel 114, the display device 116 and the components of the sub-systems may be communicatively coupled to the processor 106 (shown in FIG. 1).

Figure 4:
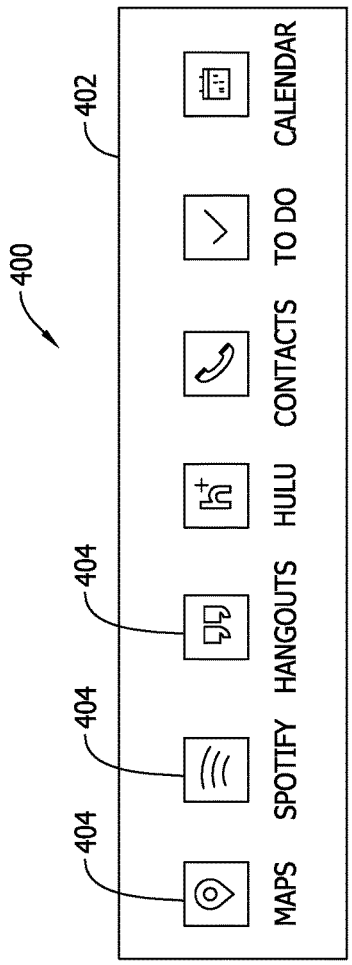
FIG. 4 illustrates exemplary application states for an application on a user interface that may be used with the vehicle control system shown in FIGS. 1 and 2.

The display device 116 may have a home menu or main menu, as shown in FIG. 4, having display icons corresponding to the various sub-systems, such as the vehicle infotainment system 110. The control panel 114 is used to maneuver through the main menu, such as to activate control of one of the sub-systems. For example, the user may touch the touchpad 122 and navigate to activate the various function modes or sources and/or to activate various function controls associated with the modes or sources. Such activation or execution may be performed by selecting a virtual button on the touchpad 122 associated with one of the display icons to activate control of the mode or source associated with such sub-system.

It should be understood that in other exemplary embodiments, the control panel 114 is combined with the display device 116, such that the user interacts with (e.g., touches) the display screen 128 directly to select or otherwise manipulate controls or other content displayed thereon, and that the embodiment of FIG. 2 is illustrative only.

Figure 3:
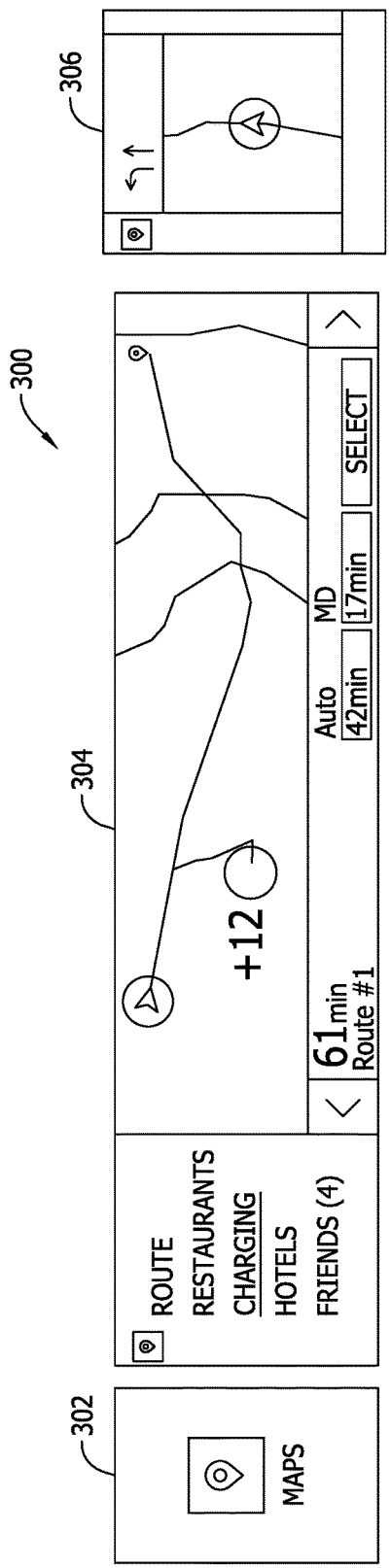
FIG. 3 is an exemplary touchpad that may be used with the vehicle control system shown in FIGS. 1 and 2.

FIG. 3 illustrates exemplary application states 300 for an application on a user interface of the exemplary vehicle control system 100 (shown in FIG. 1). In the exemplary embodiment, each application may be displayed in one of three states: an inactive state 302, an active state 304, and a collapsed active state 306. FIG. 3 illustrates these three states for a navigation application.

In the inactive state 302, the application is not presently active. In the exemplary embodiment, the application in the inactive state 302 appears as an icon with a name. The user may select the icon to activate the application.

In the active state 304, the application is fully active and the user may interact with the features of the application. For example, in the case of the navigation application, the user may select a destination and a route to take to that destination using the touchpad 122 (shown in FIG. 1).

In the collapsed activate state 306, the application is still active and is still displaying information to the user, but is not fully interactive. For example, in the collapsed active state 306 a navigation application may display a portion of the current route and a music application may display information about the currently playing song. In some embodiments, the application in the collapsed active state 306 allows the user limited functionality, such as skipping to the next song in a music application. In the exemplary embodiment, the user may select the collapsed active application to reactivate the application into the active state 304.

In some embodiments, the user presses a button or option to collapse the application from the active state 304 into the collapsed active state 306. In other embodiments, the vehicle control system 100 changes the application from the active state 304 to the collapsed active state 306 after a predetermined period of time has occurred without user interaction. In other embodiments, the vehicle control system 100 puts the application into the collapsed active state 306 when the user activates a different application.

In some embodiments, only a single application may be in the active state 304 and thereby interactive. In these embodiments, the touchpad 122 is directly mapped to the display of the application in the active state 304. The user is only able to interact with the active state 304 application. In these embodiments, the user may only interact with the inactive state 302 and collapsed active state 306 applications when there isn't an application in the active state 304. When there are no active state 304 applications, the user may use the touchpad 122 to interact with one of the collapsed state 306 applications and/or select one of the inactive state 302 and collapsed active state 306 applications.

In some embodiments, the elongated display screen 208 displays multiple applications in the collapsed active state 306. For example the elongated display screen 208 may display a navigation application and a music application in the collapsed active state 306. In these embodiments, the most recently active program is positioned in a prominent position, such as closest to the driver of the vehicle. In locations where the driver is positioned to the left of the vehicle, the most recently open application that is in the collapsed active state 306 is positioned the farthest to the left on the display screen of the collapsed active applications. In locations where the driver is positioned to the right of the vehicle, the most recently open application that is in the collapsed active state 306 is positioned the farthest to the right on the display screen. In some embodiments, the user may rearrange the order of the applications being displayed in any of the three states, such as through use of the touchpad 122.

In some embodiments, the active application is prominently displayed closest to the driver, while the collapsed active applications are the next farthest away, and the inactive applications are farthest away from the driver. In some embodiments, the driver may move its finger side to side to scroll through the applications to more easily select or interact with applications that may be farther away.

In some embodiments, a button, such as button 216 (shown in FIG. 2) is a dedicated button that switches the display of the applications between two states. In the first state, applications are displayed in either the active state 304, the inactive state 302, or the collapsed active state 306 based on how the individual application has been activated and used. The second state is where all of the applications are displayed in the inactive state 302, whether or not they are actually inactive, such as the main menu 402 (shown in FIG. 4). For example, the system 100 defaults to the first state. However, whenever the user presses the dedicated button, the display device 116 displays all of the applications in the inactive state 302. In this state, the user may move its finger side to side to scroll through the available applications to select one. When the user presses the button again, or after a predetermined period of time expires, the display device 116 returns to displaying the applications in the first state.

FIG. 4 illustrates a screenshot of an exemplary user interface 400 of the vehicle control system 100 (shown in FIG. 1). The user interface 400 displays a main menu 402 including a plurality of inactive applications 404. In some embodiments, the main menu 402 may be reached by a dedicated physical button, such as button 216 (shown in FIG. 2).

Figure 5:
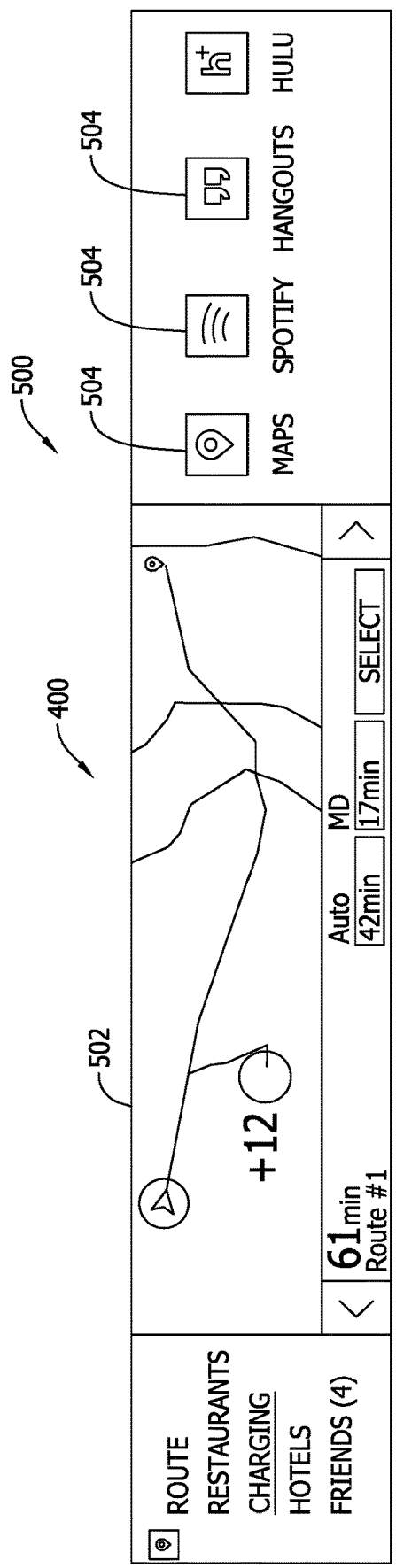
FIG. 5 illustrates another screenshot of the exemplary user interface shown in FIG. 4.

FIG. 5 illustrates another screenshot 500 of the exemplary user interface 400 (shown in FIG. 4). Screenshot 500 of the user interface 400 displays one active application 502 and a plurality of inactive applications 504. Active application 502 is an application which transitioned from an inactive state 302 (shown in FIG. 3) as an inactive application 404 (shown in FIG. 4) to an active state 304 (shown in FIG. 3). In screenshot 500, active application 502 is positioned to the left of the user interface 400. In this screenshot 500, the user may fully interact with the active application 502. In some embodiments, the user may only interact with the active application 502 until the user collapses or closes the active application 502.

Figure 6:
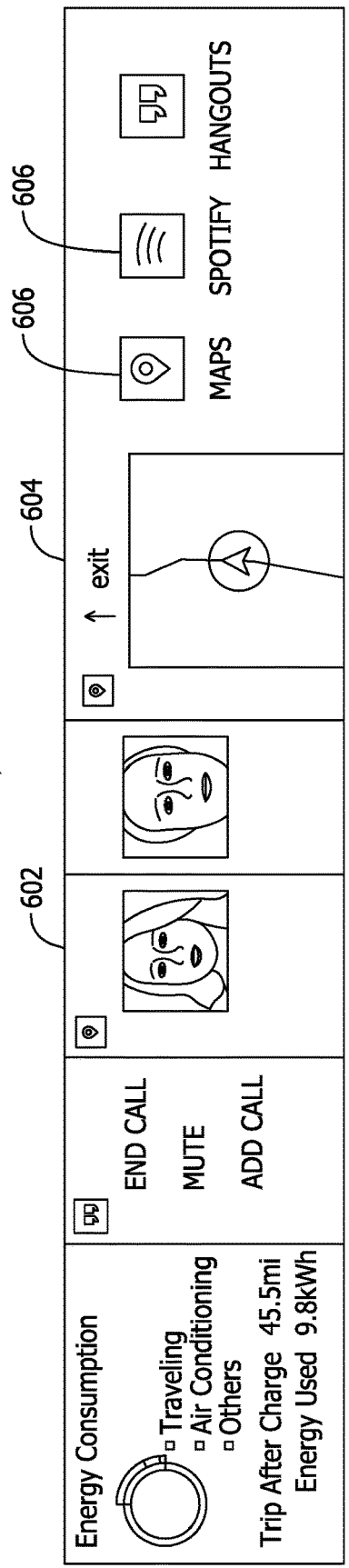
FIG. 6 illustrates a further screenshot of the exemplary user interface shown in FIG. 4.

FIG. 6 illustrates a further screenshot 600 of the exemplary user interface 400 (shown in FIG. 4). In screenshot 600, there is a first application 602 in an active state 304 (shown in FIG. 3), a second application 604 in a collapsed active state 306 (shown in FIG. 3), and multiple inactive applications 606 in the inactive state 302 (shown in FIG. 3). In this screenshot 600, the user may fully interact with the active application 602. In some embodiments, the user may only interact with the active application 602 until the user collapses or closes the active application 602.

For example, starting at FIG. 4, the user selected and activated the inactive application 404 associated with the navigation application. The navigation application activated as shown in FIG. 5. From FIG. 5, the user activated the video calling application. In some embodiments, the user was able to select the inactive application 504 for the calling application from the view shown in screenshot 600. When the user activated the video calling application, the navigation application collapsed into the collapsed active state 306 as shown by the second application 604 and activated the video calling application into the active state 304 as shown by the first application 602. In other embodiments, the user collapsed the active application 502 into the collapsed active state 306 before being able to interact with the inactive application 504.

If the user selects the music application from inactive applications 606, then the system would collapse the video calling application into the collapsed active state 306 and activate the music application. In this case, the order of applications from left to right would be the active music application, then the collapsed video calling application, next the collapsed navigation application 604, and then the inactive applications 606.

If the user then selected the collapsed navigation application 604 would move all of the way to the right and transition to the active state 304, while the music application collapses into collapsed active state 306. In this situation, the order of applications from left to right would be the active navigation application, the collapsed music application, the video calling application, and then the inactive applications 606. The user may also change the order of the collapsed active applications by dragging the different applications into different positions.

As more applications are opened, the available display space on the elongated display screen 208 may be less than is required to show all the applications. In this situation, applications may be pushed off of the visible display to the right. The user may still access these applications by scrolling the user interface. In some embodiments, the user interface may return to its previous, unscrolled state.

Figure 7:
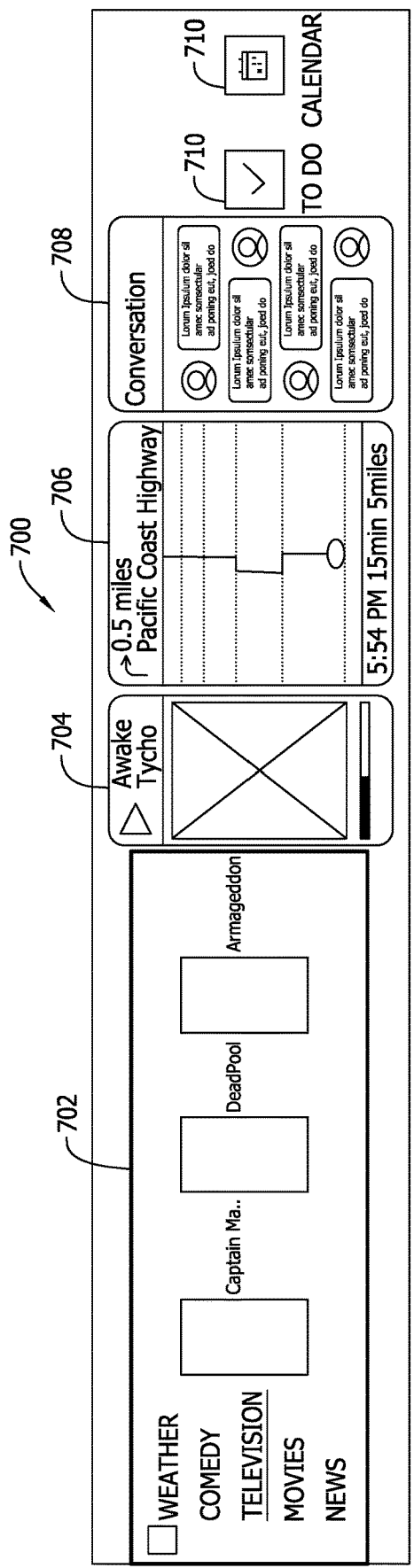
FIG. 7 illustrates still a further screenshot of the exemplary user interface shown in FIG. 4.

FIG. 7 illustrates still a further view 700 of the exemplary user interface 400 (shown in FIG. 4). View 700 displays an active application 702, three collapsed active applications 704, 706, and 708, and inactive applications 710. In some embodiments, application 708 was activated first, application 706 activated second, application 704 activated third, and then application 702 activated most recently.

In some embodiments, the user may only interact with one active application at a time. This is the active/interactive application 702. Other applications may be active, but in a mode, where the user is unable to interact with them. In these embodiments, the touchpad 122 is mapped to the portion of the elongated display 208 that displays the interactive application 702, such that the user is unable to interact with the other applications until the interactive application 702 is closed. For example, a user may browse a selection of applications using the touchpad 122. When the user selects an application, that application becomes the interactive application 702 and the touchpad 122 is hard mapped to the display of that application.

Figure 8:
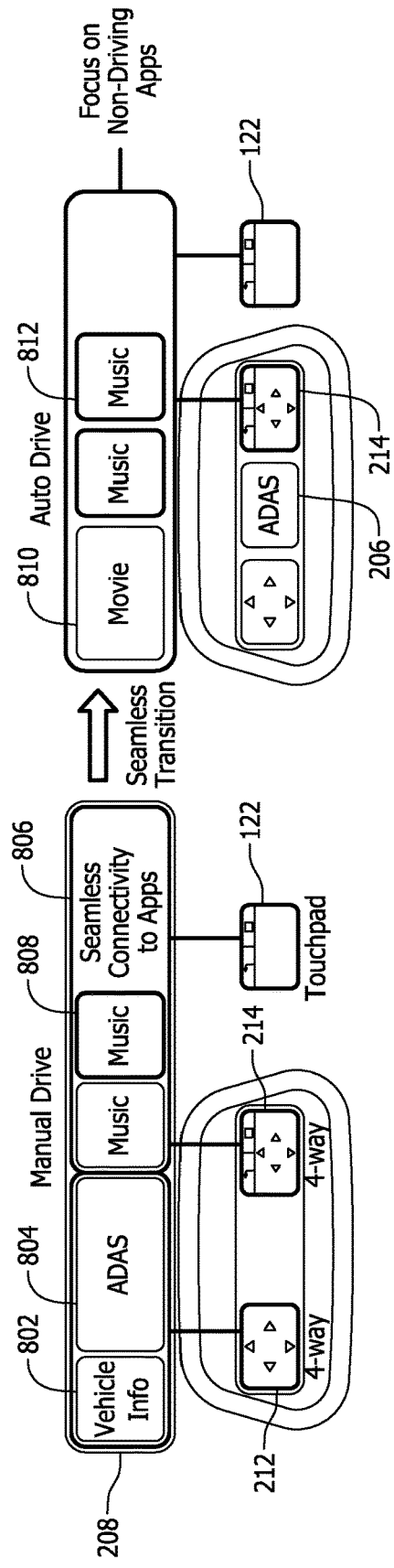
FIG. 8 illustrates a flow diagram of an exemplary user interface of the vehicle control system shown in FIG. 1, in accordance with one embodiment of the disclosure.

FIG. 8 illustrates a flow diagram of an exemplary user interface 800 of the vehicle control system 100 (shown in FIG. 1), in accordance with one embodiment of the disclosure. In some embodiments, the user interface 400 includes two modes for the vehicle. The first mode is a manual drive mode while the second mode is an autonomous drive mode.

In the manual drive mode, the elongated display screen 208 (shown in FIG. 2) includes a vehicle control section 802 and an application section 806. The vehicle control section 802 displays information 804 about the control of the vehicle. Whereas, the application section 806 includes a plurality of applications 808 for the user to interact with. In some embodiments, when in manual drive mode, the vehicle control section is controlled by the left keypad 212 on the steering wheel 204 (both shown in FIG. 2). The application section 806 is controlled by the right keypad 214 and the touchpad 122 (both shown in FIG. 2). Then when in autonomous drive mode, the vehicle control section 802 is removed (partially or completely) from the elongated display screen 208 and some of the information 804 is displayed on the steering wheel display 206. The entire elongated display screen 208 displays an application user interface 810 which displays multiple applications 812. In these embodiments, the application user interface 810 is controlled by the right keypad 214 and the touchpad 122.

Figure 9:
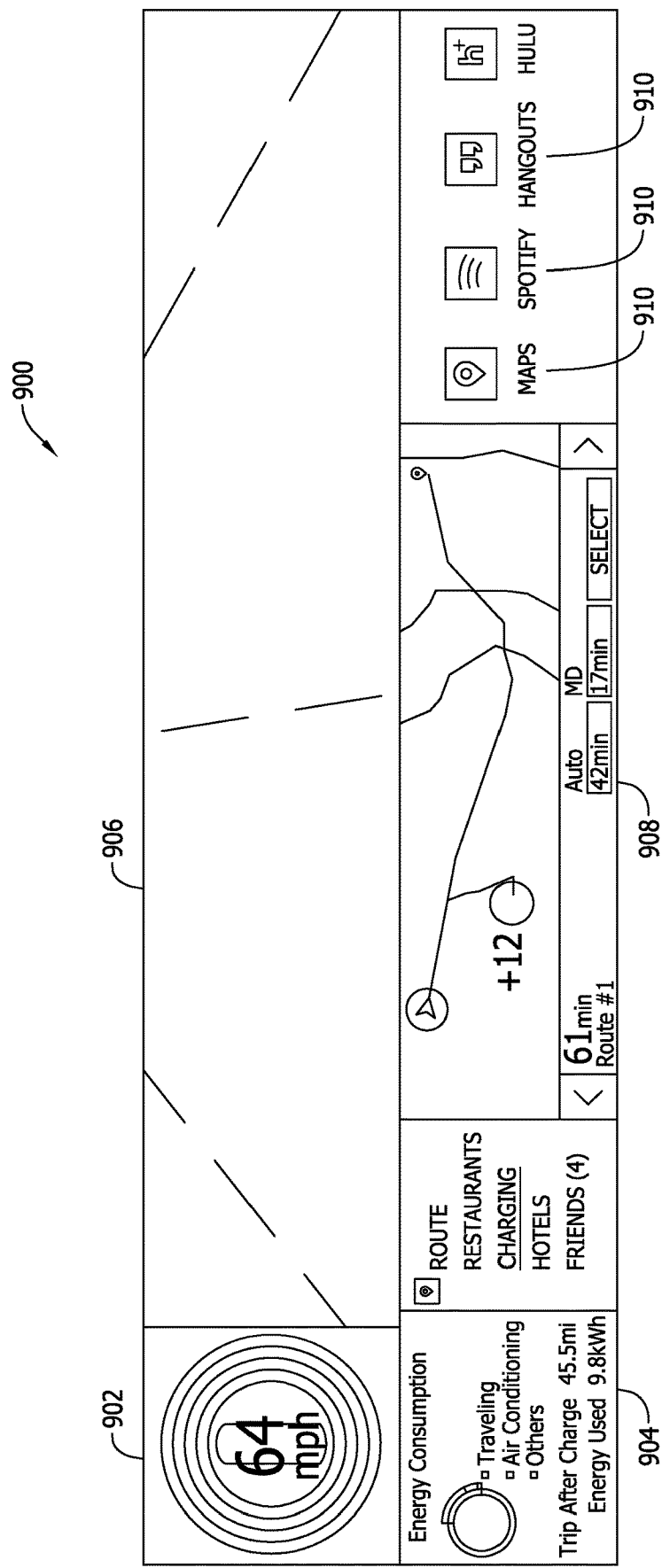
FIG. 9 illustrates a view of the exemplary user interface shown in FIG. 8 for the vehicle control system shown in FIG. 1.

FIG. 9 illustrates a view 900 of the exemplary user interface 800 (shown in FIG. 8) for the vehicle control system 100 (shown in FIG. 1). View 900 displays when the vehicle is in autonomous drive mode. Display 902 illustrates vehicular information that may be displayed in the steering wheel display 206 (shown in FIG. 2). View 906 shows the user's view out of the front windshield. Elongated display screen 904 displays an active application 908 and a plurality of inactive applications 910.

While the above embodiments describe using a music application and a navigation application, the systems described herein may also be used with other application, such as, but not limited to, a phone calling application, a messaging application, and a video streaming application.

Embodiments of the touchpad and display interaction systems described herein facilitate increasing the flexibility and ease of use of interacting with a display screen. The systems described herein provide enhanced communication between the user and the display screen, without requiring the user to lean forward to interact with the information displayed on the display screen. The systems described herein also provide the user with additional options for interacting with the applications.

The methods and system described herein may be implemented using computer programming or engineering techniques including computer software, firmware, hardware, or any combination or subset. Some technical problems with known systems include (a) a need to facilitate communicating information effectively a user, such as a driver; (b) increasing variability and flexibility in how information is displayed to the user; and (c) standardizing how the user interacts with applications to reduce the amount of concentration required to activate these systems. Embodiments of the systems and methods described herein address such technical problems. The technical effect of at least some embodiments of the systems and processes described herein is achieved by performing at least one of the following steps: (a) displaying the plurality of applications in an inactive state; (b) receiving a user input to activate a first application of the plurality of applications; (c) transitioning the first application into an active state; and (d) displaying the active first application to the left of the plurality of inactive applications on the display screen. The resulting technical effect is enhanced communication between the user and the display screen, without requiring the user to lean forward to interact with the information displayed on the display screen.

In some embodiments, the technical effect is also achieved by: (e) receiving a second user input to activate a second application of the plurality of applications; (f) transitioning the second application into an active state; (g) displaying the active second application to the left of the first application which is to the left of the plurality of inactive applications; (h) transitioning the first application into a collapsed active state; (i) displaying the first application in a size between the active second application and each of the inactive applications; (j) receiving a third user input to activate a third application of the plurality of applications; (k) transitioning the third application into an active state; (l) displaying the active third application to the left of the second application which is to the left of first application which is to the left of the plurality of inactive applications; (m) displaying the first application and the second application in a collapsed active state; (n) receiving a third user input to reactivate the first application; and (o) displaying the first application to the left of the second application which is to the left of the plurality of inactive applications.

One or more embodiments include a system, which may be implemented as a programmable logic controller (PLC), also referred to as a programmable logic circuit or simply "controller," that controls various functions and operations of the vehicle, such as a vehicle infotainment system and the like. The controller may control display functions on one or more display devices or screens. The controller may monitor, receive, detect, interpret, and/or transmit one or more inputs or outputs between a display device and a control panel. Moreover, the controller may receive, detect, monitor, and/or transmit signals from other components of the vehicle control system, including sensors and actuators.

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A vehicle infotainment system comprising:
a display screen for displaying a plurality of applications; and
a controller communicatively coupled to the display screen, wherein the controller is configured to:
display the plurality of applications in an inactive state, wherein the plurality of inactive applications are displayed in a horizontal row on the display screen;
receive a user input to activate a first application of the plurality of applications;
transition the first application into an active state; and
simultaneously display the active first application and the plurality of inactive applications on the display screen, wherein the active first application is to the left of the plurality of inactive applications, and wherein all of the plurality of inactive applications are shifted to the right and displayed horizontally to the right of the active first application.

2. The vehicle infotainment system in accordance with claim 1, wherein the controller is further configured to:
receive a second user input to activate a second application of the plurality of applications;
transition the second application into an active state; and
simultaneously display the active second application, the active first application, and the plurality of inactive applications, wherein the active second to the left of the active first application which is to the left of the plurality of inactive applications.

3. The vehicle infotainment system in accordance with claim 2, wherein the controller is further configured to:
transition the first application into a collapsed active state; and
simultaneously display the active second application, the collapsed first application, and the plurality of inactive applications, wherein the collapsed first application is in a size between the active second application and each of the plurality of inactive applications.

4. The vehicle infotainment system in accordance with claim 2, wherein the controller is further configured to:
receive a third user input to activate a third application of the plurality of applications;
transition the third application into an active state; and
simultaneously display the active third application, the active second application, the active first application, and the plurality of inactive applications, wherein the active third application is to the left of the active second application which is to the left of the active first application which is to the left of the plurality of inactive applications.

5. The vehicle infotainment system in accordance with claim 4, wherein the controller is further configured to simultaneously display the first application and the second application in a collapsed active state.

6. The vehicle infotainment system in accordance with claim 2, wherein the controller is further configured to:
receive a third user input to reactivate the first application; and
simultaneously display the first application to the left of the second application which is to the left of the plurality of inactive applications.

7. The vehicle infotainment system in accordance with claim 1, wherein the controller is further configured to transition the first application into a collapsed active state based on not receiving a user input within a predetermined period of time.

8. The vehicle infotainment system in accordance with claim 1, wherein the controller is further configured to:
receive a second user into to transition the first application into an inactive state; and
display the first application in an inactive state among the plurality of inactive applications.

9. The vehicle infotainment system in accordance with claim 1, wherein the display screen is an elongated display screen embedded in a dashboard of a vehicle, and wherein the plurality of inactive applications are displayed in a horizontal orientation.

10. The vehicle infotainment system in accordance with claim 1, wherein the controller is further configured to display the plurality of applications in a first manner during a first mode of operation of a vehicle and to display the plurality of applications in a second manner during a second mode of operation of the vehicle.

11. A method of operating a user interface, the method implemented by at least one processor in communication with at least one memory device, and a display screen, and wherein the method comprises:
    displaying a plurality of applications in an inactive state, wherein the plurality of inactive applications are displayed in a horizontal row on the display screen;
    receiving a user input to activate a first application of the plurality of applications;
    transitioning the first application into an active state; and
    simultaneously displaying the active first application and the plurality of inactive applications on the display screen, wherein the active first application is to the left of the plurality of inactive applications, and wherein all of the plurality of inactive applications are shifted to the right and displayed horizontally to the right of the active first application.

12. The method in accordance with claim 11 further comprising:
    receiving a second user input to activate a second application of the plurality of applications;
    transitioning the second application into an active state; and
    simultaneously displaying the active second application, the active first application, and the plurality of inactive applications, wherein the active second to the left of the active first application which is to the left of the plurality of inactive applications.

13. The method in accordance with claim 12 further comprising:
    transitioning the first application into a collapsed active state; and
    simultaneously displaying the active second application, the collapsed first application, and the plurality of inactive applications, wherein the collapsed first application is in a size between the active second application and each of the plurality of inactive applications.

14. The method in accordance with claim 12 further comprising:
    receiving a third user input to activate a third application of the plurality of applications;
    transitioning the third application into an active state; and
    simultaneously displaying the active third application, the active second application, the active first application, and the plurality of inactive applications, wherein the active third application is to the left of the active second application which is to the left of the active first application which is to the left of the plurality of inactive applications.

15. The method in accordance with claim 14 further comprising simultaneously displaying the first application and the second application in a collapsed active state.

16. The method in accordance with claim 12 further comprising:
    receiving a third user input to reactivate the first application; and
    simultaneously displaying the first application to the left of the second application which is to the left of the plurality of inactive applications.

17. The method in accordance with claim 11 further comprising transitioning the first application into a collapsed active state based on not receiving a user input within a predetermined period of time.

18. The method in accordance with claim 11 further comprising:
    receiving a second user into to transition the first application into an inactive state; and
    displaying the first application in an inactive state among the plurality of inactive applications.

19. The method in accordance with claim 11, wherein the display screen is an elongated display screen embedded in a dashboard of a vehicle, and wherein the plurality of inactive applications are displayed in a horizontal orientation.

20. The method in accordance with claim 11 further comprising displaying the plurality of applications in a first manner during a first mode of operation of a vehicle and to display the plurality of applications in a second manner during a second mode of operation of the vehicle.

* * * * *